Dec. 28, 1943.   W. L. TANCRED   2,337,844
PREDETERMINING COUNTER MECHANISM
Filed Dec. 6, 1941   4 Sheets-Sheet 1
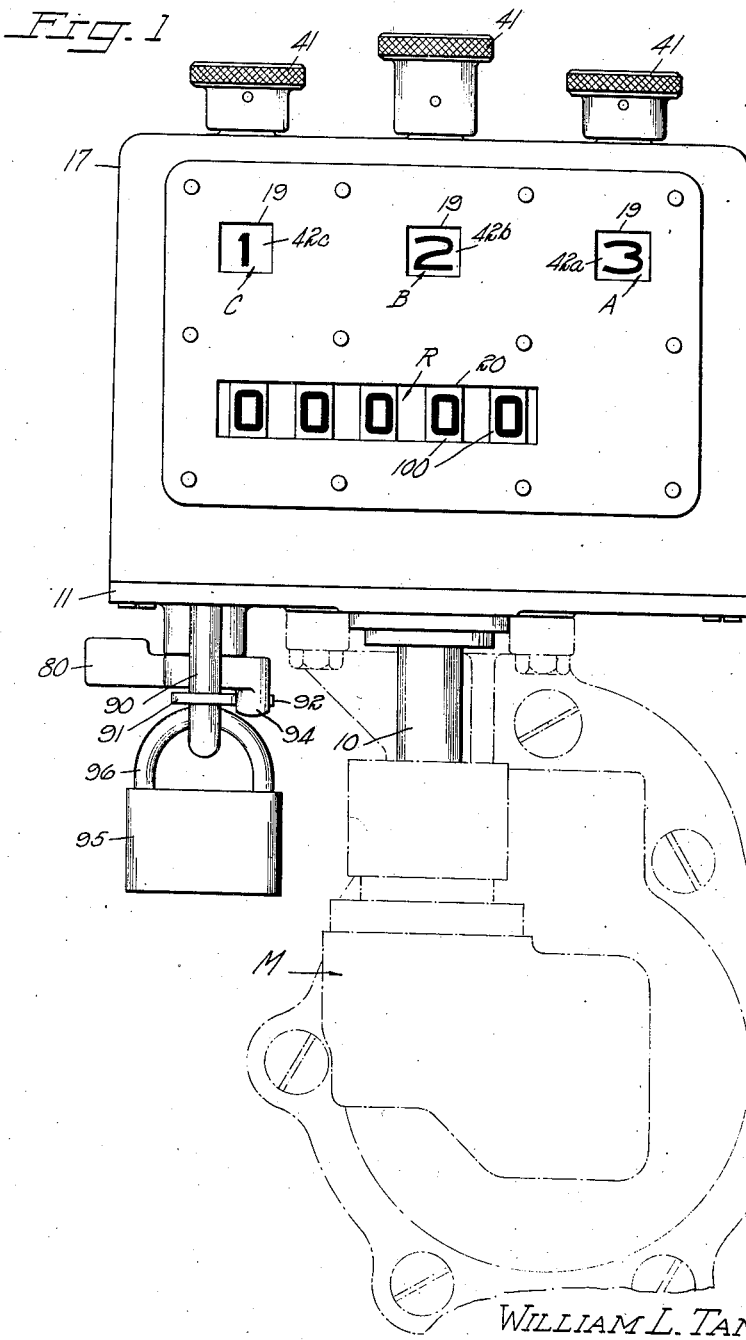
Inventor
WILLIAM L. TANCRED
By Lindsey and Robillard
Attorneys Dec. 28, 1943.   W. L. TANCRED   2,337,844
PREDETERMINING COUNTER MECHANISM
Filed Dec. 6, 1941   4 Sheets-Sheet 2
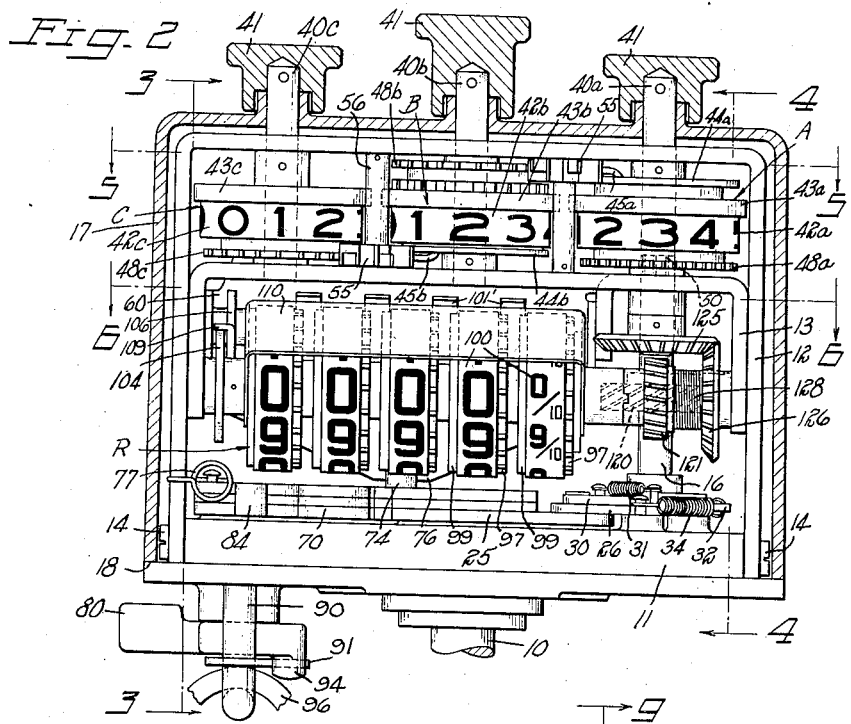
Inventor
WILLIAM L. TANCRED
By Lindsey and Robillard
Attorneys Dec. 28, 1943.                W. L. TANCRED                2,337,844
                    PREDETERMINING COUNTER MECHANISM
                         Filed Dec. 6, 1941          4 Sheets-Sheet 3
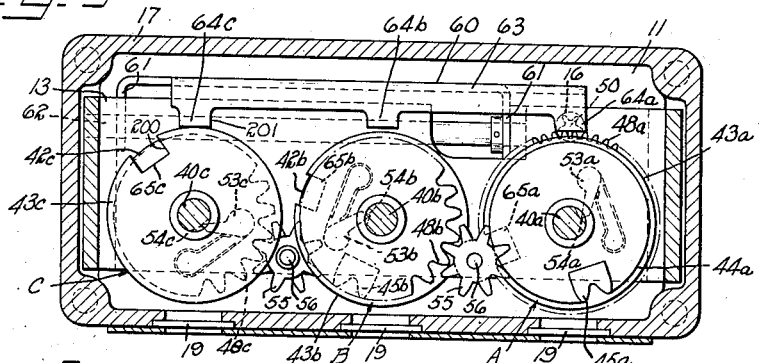
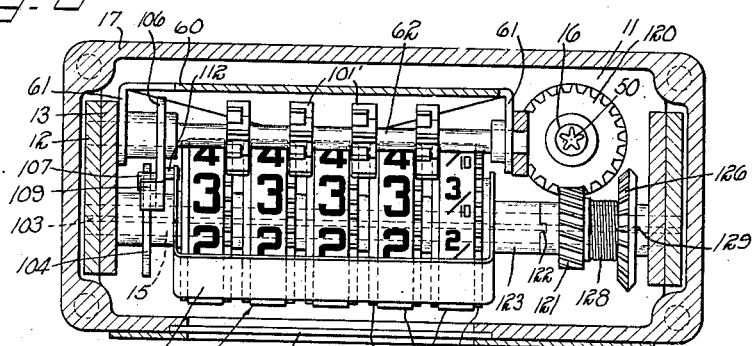
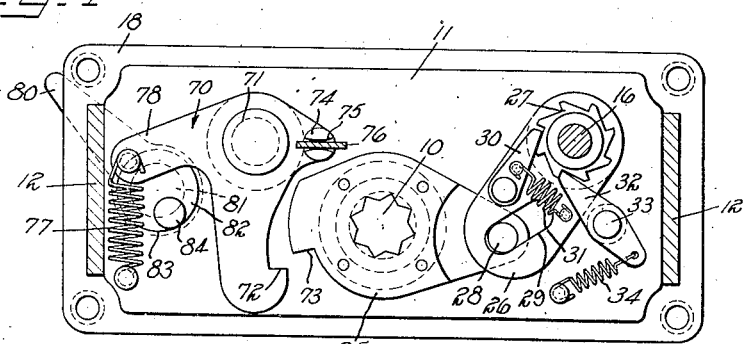
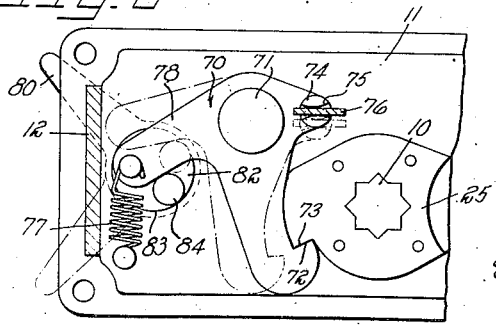
Inventor
WILLIAM L. TANCRED
By Lindsey and Robillard
Attorneys Dec. 28, 1943.   W. L. TANCRED   2,337,844
PREDETERMINING COUNTER MECHANISM
Filed Dec. 6, 1941   4 Sheets-Sheet 4
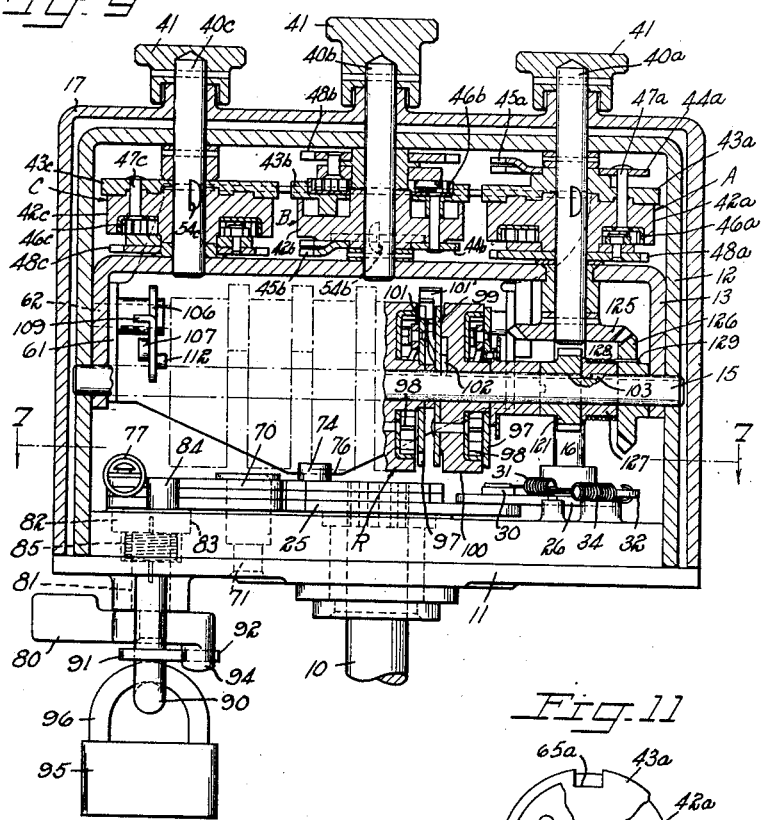
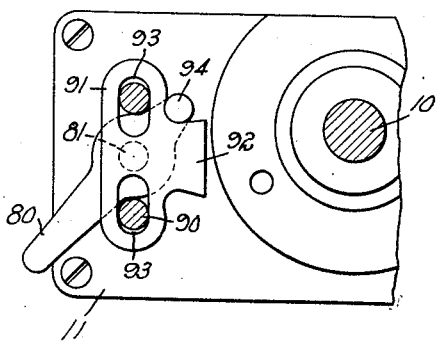
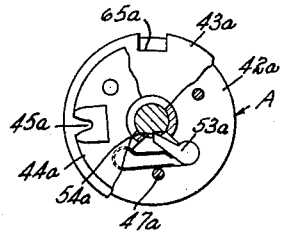
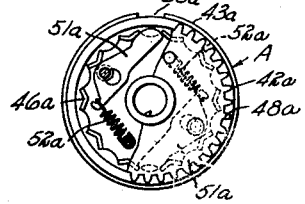
Inventor
WILLIAM L. TANCRED
By Lindsey and Robillard
Attorneys Patented Dec. 28, 1943

2,337,844

UNITED STATES PATENT OFFICE 2,337,844

PREDETERMINING COUNTER MECHANISM

William L. Tancred, Hartford, Conn., assignor to Veeder-Root Incorporated, Hartford, Conn., a corporation of Connecticut Application December 6, 1941, Serial No. 421,906

8 Claims. (Cl. 235—132)

This invention relates to counter mechanisms having a predetermining counter for automatically stopping the apparatus with which it is associated when a predetermined number of operations or units have been performed or counted, and a registering counter for indicating the number of operations or units performed or counted. While the counter mechanism of the present invention has various applications, it is particularly adapted to be used in connection with pumps for dispensing gasoline and the like. For example, the mechanism may be used to advantage in cases where an oil company or other supplier delivers to a distributor or retailer gasoline in a larger amount than the retailer cares to pay for at one time, and the supplier desires that the retailer does not dispense more of the delivered gasoline than has been paid for. With the present arrangement, the predetermining counter may be preset by the supplier in accordance with the amount of gasoline paid for, and when that amount has been dispensed, the apparatus is automatically stopped so that the retailer can dispense no more until he has made another payment and the supplier presets the predetermining counter in accordance with such payment. During the dispensing of such paid-for gasoline, the amount dispensed is indicated by the registering counter.

An aim of the invention is to provide an improved mechanism of this sort which has various features of novelty and advantage and which is particularly characterized by its simplicity and economy in construction, its effectiveness in operation, and the ease and facility with which the predetermining counter may be preset and the registering counter may be reset to zero or other indication.

A further aim of the invention is to provide a mechanism of this kind which is accurate in its counting operations and which cannot be manipulated to falsify the account or surreptitiously manipulated to permit operation beyond the predetermined amount.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings, wherein is shown one embodiment which the invention may take:

Figure 1 is a front view of the improved counter mechanism associated with a meter, the latter being shown in broken lines as it forms no part of the present invention;

Fig. 2 is a front view of the counter mechanism with the front of the casing broken away;

Fig. 3 is a vertical transverse view taken substantially on line 3—3 of Fig. 2;

Fig. 4 is a vertical transverse view taken substantially on line 4—4 of Fig. 2;

Fig. 5 is a horizontal view showing the preset counter units in top elevation, this view being taken substantially on line 5—5 of Fig. 2;

Fig. 6 is a like view showing the registering counter in top plan, this view being taken substantially on line 6—6 of Fig. 2;

Fig. 7 is a plan view looking at the top of the base of the counter and shows in top plan the actuating mechanism through which the counters are driven and the latch member for preventing actuation of said mechanism, this view being taken substantially on line 7—7 of Fig. 9, the casing being omitted;

Fig. 8 is a view similar to Fig. 7 but showing the latch member in position for preventing actuation of the actuating means;

Fig. 9 is a longitudinal sectional view taken centrally through the counter mechanism substantially on line 9—9 of Fig. 4;

Fig. 10 is a detail view looking upwardly at the bottom of the base of the counter mechanism and showing the means for preventing the latch member from being moved from the tripped position shown in Fig. 8 to the untripped position shown in Fig. 7;

Fig. 11 is a detail view in top plan, with parts in section, of the first preset counter unit; and Fig. 12 is a bottom plan view thereof, with parts broken away.

Referring to the drawings in detail, my improved counter mechanism forming the subject matter of the present invention is shown in Fig. 1 as being mounted on a fluid meter M. The latter is illustrated in broken lines as it may be of any suitable construction and forms no part of the present invention. The meter has a meter shaft 10 which constitutes the drive shaft for the counter mechanism. This meter shaft may be oscillated back and forth about its axis during the operation of the meter.

The counter mechanism has a base 11 through which the upper end of the drive shaft 10 extends. Secured to the base is a skeleton frame which supports the predetermining counter and the registering counter R. This frame, in the present instance, comprises a main bracket 12 and a subbracket 13 each constructed, in the interest of economy, of a strip of flat metal bent to form a connecting portion and two depending end legs. The subbracket fits within the main bracket and the legs of the subbracket are welded or otherwise secured to the legs of the main bracket. The lower ends of the legs of the main bracket straddle the base 11 and are secured thereto as by means of screws 14 or the like. The connecting or horizontal portions of the two brackets are vertically spaced apart so as to accommodate between them the predetermining counter units A, B, and C of the predetermining counter. The registering counter R has a plurality of counter units rotatably supported on a reset shaft 15, the ends of which are journaled in the legs of the two brackets. Journaled at its upper end in the connecting portion of the subbracket and at its lower end in the base 11 is a vertical driven shaft 16 which is operatively connected, as hereinafter described more in detail, to the first counter unit A of the predetermining counter and to the counter unit of lowest order of the registering counter. The numeral 17 designates a casing adapted to be inserted over the top of the counter mechanism and to rest at its lower edge upon the laterally extending peripheral flange 18 of the base. This casing has windows 19 through which the several counter wheels of the predetermining counter may be observed and a window 20 through which the registering counter R may be viewed.

The driven shaft may be driven from the drive shaft through any suitable actuating mechanism such, for example, as through an actuating cam 25 fixed to the upper end of the drive shaft 10, a pawl carrier 26 loosely journaled about the driven shaft 16, and a ratchet wheel 27 fixed to the driven shaft 16 (see Figs. 7 and 9). The actuating cam, which is oscillated by the meter during the dispensing operation, carries a pin 28 which works in an elongated slot 29 in the pawl carrier. Pivotally carried by the pawl carrier is a ratchet pawl 30 which is urged into engagement with the ratchet wheel 27 by a spring 31, the opposite respective ends of which are anchored to the pawl and the pawl carrier. For the purpose of preventing the driven shaft 16 from being rotated in a direction opposite to that in which it is driven by the actuating cam, a non-return pawl 32 is provided. This pawl is pivoted to a stud 33 carried by the base 11 and is urged into engagement with the ratchet wheel 27 by a spring 34. It is clear that when the meter is driven during a dispensing operation, the actuating cam is oscillated, and upon each counterclockwise stroke of that cam, the pawl 30 will advance the driven shaft 16 one step, and upon each clockwise stroke of the actuating cam, the pawl will ratchet over the ratchet wheel.

Referring now to the predetermining counter, the same has three counter wheel units A, B, and C located in side by side relation between the two brackets 12 and 13. The units are respectively provided with preset shafts 40a, 40b, and 40c journaled in the brackets 12 and 13. The upper ends of these shafts extend through apertured bosses on the top wall of the casing 17 and carry operating knobs 41. The counter units A, B, and C (see Figs. 9, 11, and 12) are of similar construction and, therefore, a description of one will apply generally to all. Like reference numerals are employed to indicate corresponding parts, the reference numerals being followed by the letters a, b, and c to differentiate the various units. Referring to the unit A which, in the present instance, may be employed to designate units of gallons dispensed, the same has a rotary assembly which includes a number wheel 42a provided on its periphery with numerals running from 9 to 0; a predetermining or indexing disk 43a on the top of the wheel 42a; a locking disk 44a above the disk 43a and carrying a mutilated driving or two-toothed gear 45a; and an internal ratchet wheel 46a on the bottom of the wheel 42a. These elements are secured together by rivets 47a. Journaled on the preset shaft 40a below the assembly just described is a driven gear 48a with which meshes a pinion 50 fixed to the upper end of the driven shaft 16 (see Fig. 4). In the present illustrative disclosure, the pinion 50 has five teeth and the gear 48a has fifty teeth so that the gear is turned one-tenth of a revolution for each full revolution of the driven shaft. Between the driven gear 48a and the counter wheel 42a is a one-way drive or ratchet which is here shown as being of the same construction as that disclosed in the patent to Bliss et al., No. 2,133,777, granted October 18, 1938. It comprises, as shown most clearly in Fig. 12, said ratchet wheel 46a and ratchet pawls 51a carried by the gear 48a and urged into engagement with the teeth of the ratchet wheel by springs 52a. Carried by the number wheel (see Fig. 11) is a spring-pressed pivoted preset pawl 53a which cooperates in the usual manner with a shoulder 54a on the preset shaft 40a. When it is desired to preset the wheel to a predetermined number, the shaft 40a is rotated counterclockwise (reference being had to Fig. 5) until that number appears in the right hand window 19, it being clear that during such rotation of the shaft the shoulder 54a thereon will pick up the pawl 53a and the wheel therethrough, and during such turning movement of the wheel, the one-way ratchet pawls 51a will ratchet over the teeth of the internal ratchet wheel 46a so that the driven gear 48a remains stationary. During a registering operation, the meter through the drive shaft 10 and driven shaft 16 drives the driven gear 48a counterclockwise, and, due to the one-way ratchet, the number wheel 42a is driven in unison therewith. During such time, the preset shaft 40a remains stationary and the preset pawl 53a ratchets over that shaft.

The counter wheel unit B is like the counter unit A except that the driven gear 48b is above and the locking disk 44b is below the number wheel 42b and the driven gear 48b has ten teeth instead of fifty teeth. The unit C is also like the unit A except that it is not provided with a locking disk nor a mutilated pinion (since it is last in the series), and the driven gear 48c has ten teeth instead of fifty teeth. Between the mutilated pinion of one number wheel and the driven gear of the next one is a transfer pinion 55 (see Figs. 2 and 5), through which a carrying movement of one step is transferred from a wheel of lower order to a wheel of higher order upon each complete revolution of the wheel of lower order. These pinions are journaled on vertical rods 56 supported at their upper and lower ends in the brackets 12 and 13. The pinions are of the usual construction, the same having alternate long and short teeth. All of the teeth mesh with the driven gear of higher order, and the long teeth are adapted to cooperate with the locking disk so as to prevent rotation of the pinions except when the same are rotated by the mutilated gear.

Operatively associated with the indexing disks 43a, 43b, and 43c are control means through which the actuating means for the counter mechanism is rendered inoperative when a predetermined count has been reached; in the present instance when the preset wheels have reached zero positions as viewed through the windows 19. This control means includes a pivoted trip member or swinging frame 60 and a latch member 70. The swinging frame is in the form of a plate having forwardly extending ears 61 at opposite sides journaled on a transverse rod or shaft 62. The upper edge of the plate has a forwardly turned flange 63 provided with fingers or lugs 64a, 64b, and 64c respectively associated with the disks 43a, 43b, and 43c. The disks respectively have notches 65a, 65b, and 65c adapted to respectively receive the lugs 64a, 64b, and 64c when all of the disks are in zero position. During a registering operation and a resetting operation, the preset wheels are turned in a subtractive direction, that is, counter-clockwise with reference to Fig. 5. The trailing edge 200 of the notch 65c associated with the preset wheel of highest order constitutes a generally radially extending or abrupt shoulder, and the opposing shoulder or right side edge 201 of the lug 64c is also abrupt so that when the lug 64c projects into the notch 65c the preset wheel of highest order is locked against rotation. The other lugs and notches may be similarly formed. As hereinafter described more in detail, and for a purpose later to be explained, the arrangement is such that when the preset wheel C of highest order is turned to zero position, the lug 64c will move slightly into the notch 65c whereby the wheel of highest order is locked in its zero position. The latch member 70 is in the form of a lever lying in the plane of the actuating arm 25 and pivoted on a stud 71 fixed to the base. The latch member has an abutment 72 which, when the latch member is in the operative position shown by full lines in Fig. 8, is opposed to a shoulder 73 provided on the actuating arm whereby that arm is held against oscillation. The latch member has an offset stud 74 provided with a transverse kerf 75, and the frame member 60 has a depending finger 76 engaging in the kerf whereby movement of the latch member is imparted to the swinging frame. A spring 77, connected at its opposite ends to the latch member and the base 11, urges the latch member from its inoperative position, shown in Fig. 7, to its operative or latching position shown by unbroken lines in Fig. 8. It is understood that when the preset wheels are at other than zero positions, the lugs 64a, 64b, and 64c, or some of them, engage the peripheries of the indexing disks so that the swinging frame and the latch member are held in the non-tripped or inoperative positions shown in Figs. 5 and 7. When all of the disks reach zero positions, the lugs may move into the notches 65a, 65b, and 65c of the disks, thus permitting the upper end of the swinging frame, under the influence of the spring 77, to move forwardly and the latch member to move from the inoperative position shown in Fig. 7 to the operative position shown in Fig. 8. The preset wheels cannot now again be preset from their several indicating positions nor can the mechanism be driven by the drive shaft until the latch member and the swinging frame are moved to their inoperative positions shown in Figs. 5 and 7 and, in order to prevent unauthorized rendering of the mechanism operative and unauthorized presetting of the wheels of the predetermining counter, locking means, hereinafter described more in detail and including a padlock 95, is provided.

As previously stated, the arrangement is such that when the preset wheel C of highest order is brought to a zero position, the lug 64c will move slightly into the notch 65c and lock that wheel in its zero position. The purpose of this arrangement is to prevent the customer or retailer from fraudulently manipulating or presetting the wheels to a higher count than that at which the preset counter has been properly preset by the oil company or supplier. Should all of the lugs be of the same length, the lug 64c associated with the wheel of highest order would be held out of the notch of that wheel by the engagement of the other lugs against the peripheries of their associated wheels. This would permit the wheel 42c to be rotated by means of the preset shaft 40c in a subtractive direction past its zero position to a higher number than that previously indicated by this preset wheel and thus allow the dispensing of a greater amount of gasoline than was previously set up on the predetermining counter. For example, assume that 500 gallons of gasoline had been paid for and the mechanism set accordingly— the customer could immediately, or at any time after he has dispensed a portion of that 500 gallons, turn the wheel of highest order in a subtractive direction and past its zero position to the figure 9, for example. With the present arrangement, this fraudulent operation is prevented. It will be seen that when the wheel 42c reaches zero position, either when it reaches that position during a normal dispensing operation or when an attempt is made to fraudulently reset the wheel to a higher number, the lug 64c will move slightly into the notch 65c and the lug 64b will engage the periphery of the disk 43b. The trailing edge 200 of the notch 65c is now opposed to the shoulder 201 of the lug 64c and thus the wheel 42c is locked against rotation in a subtractive direction. It cannot be rotated in any other direction by the reset shaft 40c because when that shaft is rotated clockwise, the pawl 53c will ratchet with respect thereto. When the wheel 42b reaches zero indication after the wheel of highest order has reached such position, the wheel 42b cannot be turned by its preset shaft because it is locked through the transfer mechanism to the now locked wheel of highest order. Further, under such conditions, the lug 64b engages in the notch 65b so as to further insure that the wheel 42b cannot be turned. When the first preset wheel 42a subsequently reaches its zero position, the swinging frame or trip member 60 can swing to its full forward position and the actuating means is automatically stopped. It may be stated here that, of course, the customer could at any time turn the wheel of highest order from a proper indication towards zero position but in so doing he would be cheating himself because he would be turning the wheel in a subtractive direction and he cannot turn the wheel beyond zero position.

In order to manually release the latch member 70 from the actuating arm 25, cocking means operative from the outside of the casing is provided. This cocking means includes a lever 80 fixed to the lower end of a shaft 81 journaled in the base 11. On the upper end of this shaft is a circular head 82 seated in a round recess 83 and carrying an eccentrically positioned pin 84. The pin is adapted to engage the front edge of the arm 78 of the latch member 70. From Fig. 8, it is clear that when the lever or handle 80 is moved forwardly from the full line position to the dotted line position shown in Fig. 8, the pin 84 engages the arm 78 and moves the latch member from its operative to its inoperative position. If desired, the cocking means may be normally urged into the full line position shown in Fig. 8 by a spring 85 coiled about the shaft 81 below the head 82, the spring having its opposite ends connected to the head and the base 11.

It is desirable that after the counting mechanism has operated to a predetermined count resulting in tripping of the latch member to operative position, the mechanism be not again conditioned for operation by other than an authorized person such, for example, as the supplier of the gasoline. To these ends, the locking means heretofore briefly referred to is provided. This locking means is most clearly shown in Figs. 9 and 10. Secured to and depending from the base 11 in straddling relation to the shaft 81 is an inverted U-shaped shackle 90. Carried by the shackle is a locking plate 91 having a locking lug 92. The locking plate has openings 93 which accommodate the arms of the shackle so that the locking plate may move vertically into and out of its locking plane shown in Fig. 9. The handle 80 has a depending stud 94 which is held against movement by the lug 92 of the locking plate when the latter is in locking position. The locking plate is locked in its operative position, shown in Fig. 9, by any suitable key-operated or permutation lock. In the present instance, this locking means comprises the padlock 95, the shackle 96 of which is adapted to be threaded through the fixed shackle 90 below the locking plate.

Referring now to the indicating or registering counter R, the same may be of any suitable construction, it here being shown of an old and well-known type. It comprises a plurality of counter wheel units carried by the reset shaft 15. Each unit has a counter wheel 100. The wheel of lowest order may have numerals running from %10 to %10 so as to indicate tenths of a unit, such as tenths of gallons dispensed. The other wheels have numerals running from 0 to 9 and respectively indicate units, tens, hundreds, and thousands of gallons dispensed, for example. Each unit is similar to the counter wheel units of the predetermining counter in that each has a driven member or gear 97, a one-way ratchet mechanism 98 between the driven gear and the wheel, and a locking disk 99 having a mutilated or two-toothed gear 101 secured to the wheel. The ratchet mechanism 98 is like that shown in Fig. 12 and needs no further description. Between adjacent wheels, and carried by the rod 62, are transfer pinions 101' corresponding in construction and operation to the pinions 55 of the predetermining counter. Each counter wheel 100 also has a reset pawl 102. The reset shaft 15 has a longitudinal spline 103 which, when the reset shaft 15 is turned during a resetting operation, picks up the reset pawls 102 so that the wheels 100 are reset to zero or other desired indication. In order to insure that all of the reset pawls are picked up, the reset shaft is turned through an angle of more than 360° during each resetting operation, and then after the wheels have been reset, the reset shaft is automatically turned reversely through a predetermined angle. To the latter end, there is fixed to the reset shaft adjacent its left hand end, referring to Figs. 2 and 3, a concentric cam or disk 104 provided with a V notch 105, and pivoted to the rod 62 is an arm 106 having a pin 107 engaging the periphery of the cam 104. The arm is urged by a spring 108 in a direction to turn the cam 104 reversely when the pin 107 drops into the notch 105 on the completion of a resetting operation. In order to limit the extent to which the spring 108 may move the arm 106, the latter has a laterally turned ear 109 which overhangs and is adapted to engage the periphery of the cam 104 as shown most clearly in Fig. 3. The registering counter is also provided with the usual shutter 110 which, during a resetting operation, is swung down to a position behind the window 20 so as to conceal the counter wheels. In the present instance, this shutter is disclosed as being of generally U shape with the arms thereof journaled on the reset shaft 15. The left hand arm of the shutter has a radial notch 111 in which engages a pin 112 carried by the arm 106. It is understood that on initial turning movement of the reset shaft during a resetting operation, the pin 107 will ride out of the notch 105 onto the concentric periphery of the cam 104 thus raising the arm 106 and causing the shutter, through the pin 112 and the notch 111, to move to concealing position. The shaft is turned through more than 360°, whereupon the pin 107 drops back into the notch 105 so that the reset shaft and the cam 104 will rotate reversely through a predetermined angle, and during such reverse rotation, the pin 112 will cause the shutter to be raised.

The registering counter R is driven from the driven shaft 16. This shaft carries a worm 120 meshing with a worm wheel 121 journaled on the reset shaft 15. The worm wheel is keyed, as at 122, to a sleeve 123 to which is fixed the driven member 97 of the first counter wheel unit and which driven member carries ratchet pawls corresponding to the ratchet pawls 51a shown in Fig. 12. During a registering operation, the shaft 15 remains stationary and the worm wheel 121 is rotated thereon thus causing rotation of the first unit wheel in proper relation to the preset counter wheel A and the shaft 16.

In accordance with the present invention, the registering counter is reset by manually turning the preset shaft 40a of the counter wheel unit A of the predetermining counter in a direction opposite to that in which said shaft is turned when it is desired to preset the counter wheel unit A. By employing the same shaft 40a for presetting the counter wheel unit A and for resetting the registering counter, the structure is simplified, the number of parts are reduced, and a saving in the cost of manufacture is obtained. To these ends, the shaft 40a is connected to the reset shaft 15 through a clutch which will cause the reset shaft 15 to rotate in a resetting direction when the shaft 40a is rotated in one direction but will permit said reset shaft to remain stationary when the shaft 40a is rotated in the opposite direction. More particularly, it will be seen from Fig. 4 that, secured to the lower end of the shaft 40a is a bevel gear 125 meshing with a gear 126 journaled on the shaft 15. Between the gear 126 and the worm wheel 121 is a sleeve 127 splined to the reset shaft 15. About this sleeve is coiled a spring 128, one end of which is free and the other end 129 of which is secured to the gear 126. The arrangement is such that when the preset shaft 40a is turned clockwise (Fig. 5), the gear 126 is turned in a direction (counterclockwise, in Fig. 4) to cause the spring 128 to grip the sleeve 127 with the result that the sleeve and the reset shaft 15 are rotated in a resetting direction. When the gear 126 is rotated in the opposite direction (which occurs when the shaft 40a is turned in a counterclockwise direction to preset the counter wheel unit A of the predetermining counter), the spring 128 tends to be unwound so that it will not grip the sleeve 127 and, therefore, the reset shaft 15 remains stationary.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a supporting frame, a registering counter having a horizontally disposed reset shaft journaled in said frame and a series of resettable counter wheels supported by said shaft, a predetermining counter having a series of horizontally disposed preset counter wheel units positioned in side by side relation above said registering counter and also having a vertical preset shaft associated with each counter wheel unit, a vertical driven shaft operatively connected to the wheel of lowest order of the registering counter and to the preset counter wheel unit of lowest order for driving the same in unison, and a connection between the preset shaft of the counter wheel unit of lowest order and said reset shaft of said registering counter for turning said reset shaft by said mentioned preset shaft.

2. In combination, a registering counter having a series of resettable counter wheels and a reset shaft therefor; a predetermining counter having a preset wheel and a preset shaft therefor; a driven shaft operatively connected to the wheel of lowest order of the registering counter and to said preset wheel for driving the same in unison; and a driving connection between said preset shaft and reset shaft and including a one-way clutch for turning said reset shaft in a resetting direction by said preset shaft when the latter is turned in a direction opposite to that in which it is turned when presetting the preset wheel, said reset shaft being stationary when said preset shaft is turned in a direction to preset said preset wheel.

3. In combination, a series of resettable count wheels each having a reset pawl and a reset shaft having means to pick up said pawls and return said wheels to zero when said shaft is turned in a resetting direction; a preset counter having a preset wheel provided with a pawl and a preset shaft having means to pick up said pawl and turn said wheel to a predetermined number when said preset shaft is turned in a given direction, said preset shaft being inoperative to turn said preset wheel when the preset shaft is turned in the opposite direction; a driven shaft operatively connected to the wheel of lowest order of the registering counter and to said preset wheel for driving the same; and a driving connection between said preset shaft and reset shaft and including a one-way clutch for turning said reset shaft in a resetting direction by said preset shaft when the latter is turned in the opposite direction, said reset shaft being stationary when said preset shaft is turned in a direction to preset said preset wheel.

4. In combination, a supporting frame, a horizontally disposed registering counter having a resettable shaft journaled in said frame and a series of counter wheels carried by said shaft; a predetermining counter having a series of horizontally disposed preset counter wheel units located in side by side relation in said frame above said registering counter, a driven shaft operatively connected to the preset counter wheel unit of lowest order of the predetermining counter and to the wheel of lowest order of the registering counter, means located beneath said registering counter for actuating said shaft, and control means through which said actuating means is rendered inoperative when a predetermined count is reached on said predetermining counter and comprising a latch located below said registering counter for rendering said actuating means inoperative and a swinging frame pivoted between its ends and associated at its upper end with said predetermining counter and at its lower end with said latch means.

5. In combination, a base; a frame comprising a main bracket having a connecting portion and depending legs straddling and connected to said base, and a subbracket within said main bracket and having a connecting portion positioned below said first connecting portion and depending legs connected to said first depending legs; a registering counter having a reset shaft journaled in the depending legs of said brackets, and a series of operatively connected counter units carried by said reset shaft; a predetermining counter comprising a plurality of vertical preset shafts arranged in side by side relation and journaled in the connecting portions of said brackets, and preset counter units carried by said preset shafts between said connecting portions of the brackets; and a driven shaft operatively connected to the wheels of lowest order of the registering counter and the predetermining counter.

6. In combination, a casing, a plurality of preset counter units of successive orders mounted within said casing and each including a driven gear, a numeral wheel, and a one-way ratchet clutch therebetween, each of said wheels having a surface provided with a notch, transfer means between successive units, means associated with each unit for presetting the wheel thereof and including a reset pawl carried by the numeral wheel and a reset shaft extending to the outside of the casing, and control means including a movable member having fingers respectively engageable with the surfaces of said wheels and adapted to be received by the respective notches thereof when the same are aligned therewith after a predetermined count has been reached, the finger associated with the wheel of highest order being arranged to slightly enter the notch of said wheel and lock the same against rotation when said wheel is turned to zero position irrespective of the positions of the other wheels.

7. In combination, a casing, a plurality of preset counter units of successive orders within said casing and each including a driven gear, a numeral wheel, and a one-way ratchet clutch therebetween, transfer means between successive units, means for driving said units, means one for each wheel for independently presetting the same in the direction in which it is driven, said presetting means including a preset shaft having an operating member located externally of the casing, each of said wheels having a surface provided with a notch, and control means including a member having fingers respectively engageable with the surfaces of said wheels and adapted to be received by the respective notches when the same are aligned therewith after a predetermined count has been reached, said fingers being so arranged that the finger associated with the wheel of highest order will slightly engage in its respective notch before the remaining wheels reach zero position, the notch of the wheel of highest order having an abrupt trailing shoulder and the finger associated with the wheel of highest order having an abrupt shoulder opposed to said first abrupt shoulder when said finger is engaged in said notch whereby said wheel of highest order is locked against rotation by said presetting means.

8. In combination, a plurality of preset counter units of successive orders and each including a driven gear, a numeral wheel, and a one-way clutch therebetween, transfer means between successive units, means for driving the wheels in a subtractive direction during a counting operation, means one for each wheel for presetting the wheels in a subtractive direction and ineffective to turn said wheels in an additive direction, said presetting means including a shaft extending through the wall of the casing and a reset pawl carried by the wheel, each of said wheels having in its periphery a notch with a locking shoulder, and control means including a movable frame having a plurality of fingers respectively associated with said wheels and adapted to be received by said notches when the same are aligned therewith after a predetermined count has been reached, said fingers being of progressively lesser lengths starting with the finger associated with the wheel of highest order, and said fingers having locking shoulders opposed to the respective first mentioned shoulders whereby the fingers will enter the notches in succession and lock the wheels in zero positions.

WILLIAM L. TANCRED.